(12) United States Patent
Bar-Or et al.

(10) Patent No.: US 9,369,322 B2
(45) Date of Patent: Jun. 14, 2016

(54) METHOD OF DECODING A RECEIVED SC-FDMA SYMBOL IN A RECEIVER IN A OFDM COMMUNICATION SYSTEM, A RECEIVER, AN APPARATUS, AN OFDM COMMUNICATION SYSTEM AND A COMPUTER PROGRAM PRODUCT

(71) Applicants: Amit Bar-Or, Nes-Ziona (IL); Tal Dekel, Ramat Hasharon (IL); Gideon S. Kutz, Ramat Hasharon (IL)

(72) Inventors: Amit Bar-Or, Nes-Ziona (IL); Tal Dekel, Ramat Hasharon (IL); Gideon S. Kutz, Ramat Hasharon (IL)

(73) Assignee: Freescale Semiconductor, Inc., Austin, TX (US)

( * ) Notice: Subject to any disclaimer, the term of this patent is extended or adjusted under 35 U.S.C. 154(b) by 129 days.

(21) Appl. No.: 14/074,266

(22) Filed: Nov. 7, 2013

(65) Prior Publication Data

US 2015/0124796 A1    May 7, 2015

(51) Int. Cl.
*H04L 27/26* (2006.01)
*H04L 25/02* (2006.01)
*H04L 25/03* (2006.01)
*H04L 1/20* (2006.01)

(52) U.S. Cl.
CPC ............. *H04L 27/26* (2013.01); *H04L 25/022* (2013.01); *H04L 25/03159* (2013.01); *H04L 1/206* (2013.01); *H04L 27/2647* (2013.01)

(58) Field of Classification Search
None
See application file for complete search history.

(56) References Cited

U.S. PATENT DOCUMENTS

2012/0033683 A1*  2/2012  Sahlin et al. ............. 370/480
2013/0003896 A1*  1/2013  Weisman et al. .......... 375/340

OTHER PUBLICATIONS

Prasad, N. et al., "Efficient receiver algorithms for DFT-spread OFDM systems", IEEE Transactions on Wireless Communications, vol. 8, No. 6, Jun. 2009, pp. 3216-3225.
Berardinelli, G. et al., "Turbo Receivers for Single User MIMO LTA-A Uplink", IEEE 69th Vehicular Technology Conf., Apr. 2009. pp. 1-5.
Zyren, J, et al.,"White Paper—Overview of the 3GPP Long Term Evolution Physical Layer" Freescale, http://www.freescale.com/files/wireless_comm/doc/white_paper3GPPEVOLUTIONWP.pdf, 27 pages.

(Continued)

*Primary Examiner* — Awet Haile
*Assistant Examiner* — Kent Krueger

(57) ABSTRACT

A method of decoding a received SC-FDMA symbol in a receiver in a OFDM communication system is described. The method comprises calculating an approximate constellation energy $\hat{K}$ from channel matrices $H_i$ for all subcarriers i, a noise covariance matrix S, and a data signal power matrix C associated with the OFDM symbol, an approximate constellation energy $\hat{K}$. The approximate constellation energy $\hat{K}$ is calculated according to:

$$Q_i = H_i^H S^{-1} H_i;$$

$$\hat{Q} = \frac{1}{N_{sc}} \sum_{i=0}^{N_{sc}-1} Q_i;$$

$$\hat{K} = \text{diag}\left((\hat{Q} + C^{-1})^{-1}\hat{Q}\right)$$

The method further comprises decoding the received symbol using at least the associated approximate constellation energy $\hat{K}$. Also, a receiver, an apparatus, an OFDM communication system and a computer program product for such decoding are described.

13 Claims, 6 Drawing Sheets

(56) References Cited

OTHER PUBLICATIONS

Kutz, G. et al., "Semiblind Turbo Equalization Scheme for LTW Uplink Receiver," IEEE Transactions on Vehicular Technology, vol. 61, No. 9, Nov. 2012; pp. 4199-4205.

3GPP, TR 21.905 V11.0.1 (Dec. 2011), "3rd Generation Partnership Project; Technical Specification Group Services and System Aspects; Vocabulary for 3GPP Specifications (Release 11)" 64 pages.

ETSI TS 136 104 V10.7.0 (Jul. 2012), "LTE; Evolved Universal Terrestrial Radio Access (E-UTRA); Base Station (BS) radio transmission and reception (3GPP TS 36.104 version 10.7.0 Release 10)" 118 pages.

ETSI TS 136 212 V10.6.0 (Jul. 2012), "LTE; Evolved Universal Terrestrial Radio Access (E-UTRA); Multiplexing and channel coding (3GPP TS 36.212 version 10.6.0 Release 10)" 82 pages.

European Search Report mailed Apr. 18, 2013 for corresponding EP12191704, 5 pages.

* cited by examiner

Constellation diagrams for
QPSK (left), 16QAM (middle)
and 64QAM (right)

METHOD OF DECODING A RECEIVED SC-FDMA SYMBOL IN A RECEIVER IN A OFDM COMMUNICATION SYSTEM, A RECEIVER, AN APPARATUS, AN OFDM COMMUNICATION SYSTEM AND A COMPUTER PROGRAM PRODUCT

FIELD OF THE INVENTION

This invention relates to a method of decoding a received SC-FDMA symbol in a receiver in a OFDM communication system, a constellation statistics calculator, a receiver, an apparatus, an OFDM communication system and a computer program product for such decoding.

BACKGROUND OF THE INVENTION

Long Term Evolution (LTE) is the most recent step forward in cellular 3G services. LTE is a 3GPP standard that provides for an uplink speed of up to 50 megabits per second (Mbps) and a downlink speed of up to 100 Mbps. The LTE physical layer is a highly efficient means of conveying both data and control information between an enhanced base station (eNodeB) and mobile user equipment (UE). The LTE PHY employs Orthogonal Frequency Division Multiplexing (OFDM) and Multiple Input Multiple Output (MIMO) data transmission. In particular, the LTE PHY uses two types of OFDM schemes: Orthogonal Frequency Division Multiple Access (OFDMA) on the downlink (DL) and Single Carrier—Frequency Division Multiple Access (SC-FDMA) on the uplink (UL). OFDMA allows data to be directed to or from multiple users on a subcarrier-by-subcarrier basis for a specified number of symbol periods. SC-FDMA is also referred to with the term Single Carrier—Orthogonal Frequency Division Multiple Access (SC-OFDM).

OFDM systems break the available bandwidth into many narrower sub-carriers and transmit the data in parallel streams. Each sub-carrier is modulated using varying levels of QAM modulation, e.g. QPSK, QAM, 64QAM or possibly higher orders depending on signal quality. Each OFDM symbol is therefore a linear combination of the instantaneous signals on each of the sub-carriers in the channel.

Each OFDM symbol is preceded by a cyclic prefix (CP), which is used to effectively eliminate ISI. Further, the sub-carriers are very tightly spaced to make efficient use of available bandwidth, with virtually no interference among adjacent sub-carriers (Inter Carrier Interference, or ICI). The OFDM symbol consists of two major components: the CP and an FFT period (TFFT). With a CP of sufficient duration, preceding symbols do not spill over into the FFT period; there is only interference caused by time-staggered "copies" of the current symbol. Once the channel impulse response is determined (using periodic transmission of known reference signals, referred to as pilot symbols), distortion can be corrected by applying an amplitude and phase shift on a subcarrier-by-subcarrier basis.

OFDMA is employed as the multiplexing scheme in the LTE downlink. In OFDMA, users are allocated a specific number of subcarriers for a predetermined amount of time. These are referred to as physical resource blocks (PRBs) in the LTE specifications. PRBs thus have both a time and frequency dimension. Allocation of PRBs is handled by a scheduling function at the 3GPP base station (eNodeB). LTE frames are 10 msec in duration. They are divided into 10 subframes, each subframe being 1.0 msec long. Each subframe is further divided into two slots, each of 0.5 msec duration. Slots consist of either 6 or 7 ODFM symbols, depending on whether a normal or an extended cyclic prefix is employed (also referred to as short and long CP respectively). The total number of available subcarriers depends on the overall transmission bandwidth of the system. The LTE specifications define parameters for system bandwidths from 1.25 MHz to 20 MHz in terms of Physical resource block (PRB) bandwidth and number of available PRBs. A PRB is defined as consisting of 12 consecutive subcarriers for one slot (0.5 msec) in duration. A PRB is the smallest element of resource allocation assigned by the base station scheduler. The transmitted downlink signal consists of $N_{BW}$ subcarriers for a duration of $N_{symb}$ OFDM symbols. It can be represented by a so-called resource grid. Each box within the grid represents a single subcarrier for one symbol period and is referred to as a resource element. Note that in MIMO applications, there is a resource grid for each transmitting antenna. Special reference signals are embedded in the PRBs. Reference signals are transmitted during the first and fifth OFDM symbols of each slot when the short CP is used and during the first and fourth OFDM symbols when the long CP is used. Note that reference symbols are transmitted every sixth subcarrier. Further, reference symbols are staggered in both time and frequency. The channel response on subcarriers bearing the reference symbols can be computed directly from the received reference symbols. Interpolation is used to estimate the channel response on the remaining subcarriers.

The LTE PHY can optionally exploit multiple transceivers at both the basestation and UE in order to enhance link robustness and increase data rates for the LTE downlink. In particular, maximal ratio combining (MRC) is used to enhance link reliability in challenging propagating conditions when signal strength is low and multipath conditions are challenging. MIMO is a related technique that is used to increase system data rates. In order to receive a MIMO transmission, the receiver determines the channel impulse response from each transmitting antenna. In LTE, channel impulse responses are determined by sequentially transmitting known reference signals from each transmitting antenna. For example, in a Lx=2 Transmitter×Lx=2 Receiver MIMO system, there are a total of four channel impulse responses (C1, C2, C3 and C4). Note that while one transmitter antenna is sending the reference signal, the other antenna is idle. Once the channel impulse responses are known, data can be transmitted from both antennas simultaneously. The linear combination of the two data streams at the two receiver antennas results in a set of two equations and two unknowns, which is resolvable into the two original data streams.

Single Carrier—Frequency Domain Multiple Access (SC-FDMA) is used for the LTE uplink as an alternative to OFDMA as used for the LTE downlink in view of a lower power consumption. The basic transmitter and receiver architecture is very similar (nearly identical) to OFDMA, and it offers substantially the same degree of multipath protection. In SC-FDMA, the underlying waveform may be considered essentially single-carrier.

FIG. 1 schematically shows a basic SC-FDMA transmitter/receiver arrangement. Note that many of the functional blocks are common to both SC-FDMA and OFDMA, thus there is a significant degree of functional commonality between the uplink and downlink signal chains. The functional blocks in the transmit chain of the uplink are:

1. Constellation mapper: Converts incoming bit stream to single carrier symbols (BPSK, QPSK, or 16QAM depending on channel conditions);

2. Serial/parallel converter: Formats time domain SC symbols into blocks for input to FFT engine;

3. M-point DFT (also referred to as FFT block): Converts time domain SC symbol block into M discrete tones;

4. Subcarrier mapping: Maps DFT output tones to specified subcarriers for transmission. The specified subcarriers are a subset of $N_{sc}$ consecutive subcarriers within a frame, referred to as an allocation;

5. N-point IDFT: Converts mapped subcarriers back into time domain for transmission; and 6. Cyclic prefix and pulse shaping: Cyclic prefix is prepended to the composite SC-FDMA symbol to provide multipath immunity in the same manner as described for OFDM. As in the case of OFDM, pulse shaping is employed to prevent spectral regrowth;

7. RFE: Converts digital signal to analog and upconverts to RF for transmission.

The constellation mapper, serial/parallel convertor, M-point DFT and Subcarrier mapping may together be referred to as a modulator.

In a MIMO application, a constellation mapper, serial/parallel convertor and M-point DFT are provided for each incoming bit stream in parallel and the subcarrier mapping comprises mapping the DFT output tones of the different M-point DFTs over Lx transmitter antennas into so-called layers by a MIMO encoder block, whereby the DFT output tomes are mapped to the same specified subcarriers. In Multi-Users MIMO (MU-MIMO), the antennas are related to different UE terminals. In Single-User MIMO (SU-MIMO), the transmitted antennas are related to the same UE terminal.

In the receive side chain, the process is essentially reversed. As in the case of OFDM, SC-FDMA transmissions can be thought of as linear summations of discrete subcarriers. Multipath distortion is handled in substantially the same manner as in the downlink OFDMA system (removal of CP, conversion to the frequency domain, then apply the channel correction on a subcarrier-by-subcarrier basis). Unlike OFDMA, the underlying SC-FDMA signal represented by the discrete subcarriers is single carrier.

In the uplink, data is mapped onto a signal constellation that can be QPSK, 16QAM, or 64QAM depending on channel quality. FIG. 6 schematically shows constellation diagrams for QPSK (left), 16QAM (middle) and 64QAM (right). However, rather than using the QPSK/QAM symbols to directly modulate subcarriers (as is the case in OFDMA), uplink symbols are sequentially fed into a serial/parallel converter and then into an FFT block (for performing the M-point DFT) as shown in FIG. 1. The result at the output of the FFT block is a discrete frequency domain representation of the QPSK/QAM symbol sequence. The discrete Fourier terms at the output of the FFT block are then mapped to subcarriers before being converted back into the time domain (using an N-point IDFT, also referred to as IFFT). The final step prior to transmission is appending a CP.

FIG. 1 also schematically shows the receiver side REC. The functional blocks in the receive chain are:

1. RFD: Converts RF signal to digital signal.

2. Cyclic prefix removal: Cyclic prefix is removed to retain a received signal vector y associated with just the FFT period;

3. N-point DFT: Converts received signal vector y from the time domain used for transmission to the associated mapped subcarriers in the frequency domain;

4. Frequency-domain processor: to perform equalization in the frequency domain and to calculate statistics for use in the demodulator. In MIMO applications, demapping the multiple Rx receiver antenna streams is also performed by the frequency-domain processor. In MIMO applications, the demapping provides signal streams per layer;

5. M-point IDFT: Converts back to time domain symbol blocks;

6. Parallel/serial converter: Formats time domain SC symbols into blocks for input to FFT engine;

7. Decoder: decodes the SC symbols into a bit stream of information bits.

The M-Point IDFT, the parallel/serial converter and the Decoder may together be referred to as a demodulator. In MIMO-applications, an M-Point IDFT, a parallel/serial converter and a decoder is provided for each of the layers.

The Cycle Prefix removal and N-point DFT blocks performs cyclic prefix removal and Discrete Fourier transform (DFT) of antennas input samples for every OFDMA/SC-FDMA symbol. Each DFT output sample may be called sub-carrier. The DFT size N is determined according to the system bandwidth as defined in the standard.

FIG. 2 schematically shows further details of the frequency-domain processor FDPP of the uplink chain as shown in FIG. 1.

The frequency-domain processor FDPP at the receiver side is arranged to perform channel and noise estimation to obtain an estimated channel response and an estimated noise variance by correlating the DFT output with a known transmitted pilot sequence for each SC-FDMA symbol.

The estimated channel response is commonly indicated as a channel response matrix H and a noise variance matrix S. The channel response and the noise variance are estimated for each SC-FDMA symbol and each sub-carrier. The frequency-domain processor further comprises a frequency-domain equalizer arranged to equalize the DFT output in order to suppress the channel effect using the estimated channel response and the estimated noise variance. The equalizer may be arranged to equalize according to, for example, a Linear Minimum Mean Square Error criteria (LMMSE) or an equalization algorithm based on Interference Cancellation and Linear Minimum Mean Square Error criteria, such as according to Successive Interference Cancellation MMSE (SIC-MMSE) criteria or to Parallel Interference Cancellation MMSE (PIC-MMSE) criteria. These and other equalizer and criteria are known to the person skilled in the art and are thus not described in more detail here.

The shown prior art frequency-domain processor FDPP further comprise a constellation statistics calculator CSCP. The constellation statistics calculator CSCP may use the estimated channel response and the estimated noise variance to calculate the average power of the constellation as well as the average power of the interference as received after equalization and IDFT stage. The average power of the constellation may further be referred to as the constellation power or constellation energy K. The average power of the interference may further be referred to as the constellation noise variance or interference power U. The constellation power or constellation energy K and the constellation noise variance or interference power U may also be referred to as the constellation statistics.

The demodulator at the receiver side is arranged to use the constellation power K and the constellation noise variance U to decode the IDFT output to obtain information bits for each SC-FDMA symbol. The demodulator may hereto comprise a constellation demapper and a decoder. The constellation demapper and the decoder may form an integrated block, or may be provided as separate blocks. The constellation demapper may also be referred to with the term demapper. The demodulator may comprise a Turbo decoder. An example of a Turbo decoder is described for example in article Gilberto Berardinelli, Caries Navarro Manch'on, Luc Deneire, Troels B. Sørensen, Preben Mogensen, Kari Pajukoski, "Turbo Receivers for Single User MIMO LTE-A Uplink", IEEE 69th Vehicular Technology Conf., April 2009, pp. 1-5 (further referred to as Berardinelli). The demapper uses K and U in order to calculate the log-likelihood-ratio metrics (LLRs) needed for the decoding. The demodulator may alternatively comprise a Maximum likelihood Euclidian based decoder (which is for example used in LTE in a so-called Reed-Muller decoder). Such Maximum likelihood Euclidian based decoder uses K in order to scale the normalized constellation hypothesis prior to calculating the distance between the IDFT output signal and a hypothesis signal. Various Turbo decoders, Maximum likelihood Euclidian based decoders as well as other decoders are well known in the art.

Optimal or conventional as well as different receiver algorithms have been described in the literature. For example, article Narayan Prasad, Shuangquan Wang, and Xiaodong Wang, "Efficient Receiver Algorithms for DFT-Spread OFDM Systems", IEEE TRANSACTIONS ON WIRELESS COMMUNICATIONS, VOL. 8, NO. 6, JUNE 2009, p. 3216-3225 compares an alternative algorithm to the conventional algorithm. Most proposed receiver algorithms require a large amount of resources to be implemented.

SUMMARY OF THE INVENTION

The present invention provides a method of decoding a received SC-FDMA symbol in a receiver in a OFDM communication system, a constellation statistics calculator, a receiver, an apparatus, an OFDM communication system and a computer program product for such decoding as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Prior art method and receivers as described in the introduction may use a conventional receiver algorithm wherein constellation statistics are calculated according to a so-called optimal algorithm.

According to the optimal algorithm, an optimal constellation energy $K_{opt}$ and an optimal constellation variance $U_{opt}$ are calculated for each SC-FDMA symbol from the channel matrices $H_i$ for all $N_{sc}$ subcarriers i of an allocation, with i =0, . . . , $N_{sc}$–1, the noise covariance matrix S, and a data signal power matrix C according to:

$$K_{opt} = \frac{1}{N_{sc}} \sum_{i=0}^{N_{sc}-1} \text{diag}((H_i^H S^{-1} H_i + C^{-1})^{-1} H_i^H S^{-1} H_i)$$

$$U_{opt} = \frac{1}{N_{sc}} \sum_{i=0}^{N_{sc}-1} \text{diag}((H_i^H S^{-1} H_i + C^{-1})^{-1})$$

With the optimal algorithm, the average runs over all subcarriers 1, . . . , $N_{sc}$ of an allocation. The channel matrices $H_i$, the noise covariance matrix S and the data signal power matrix C may be obtained from the channel and noise estimation according to know methods. The channel matrices $H_i$ may be of dimension Rx x Lx, the noise covariance matrix S may be of dimension Rx x Rx and the data signal power matrix C may be of dimension Lx x Lx, with Lx corresponding to the number of transmit antennas used for MIMO communication and Rx corresponding to the number of receiver antennas. The data signal power matrix C is a diagonal matrix of dimensions Lx x Lx, with Lx being the number of transmit antennas. The diagonal elements of data signal power matrix C hold the average power of the associated layer. In LMMSE equalisation schemes, the data signal power matrix C may be the identity matrix. In interference cancellation schemes such as SIC-MMSE and PIC-MMSE, the data signal power matrix C may be obtained according to well-known techniques according to the specific interference cancellation method.

Figure 3:
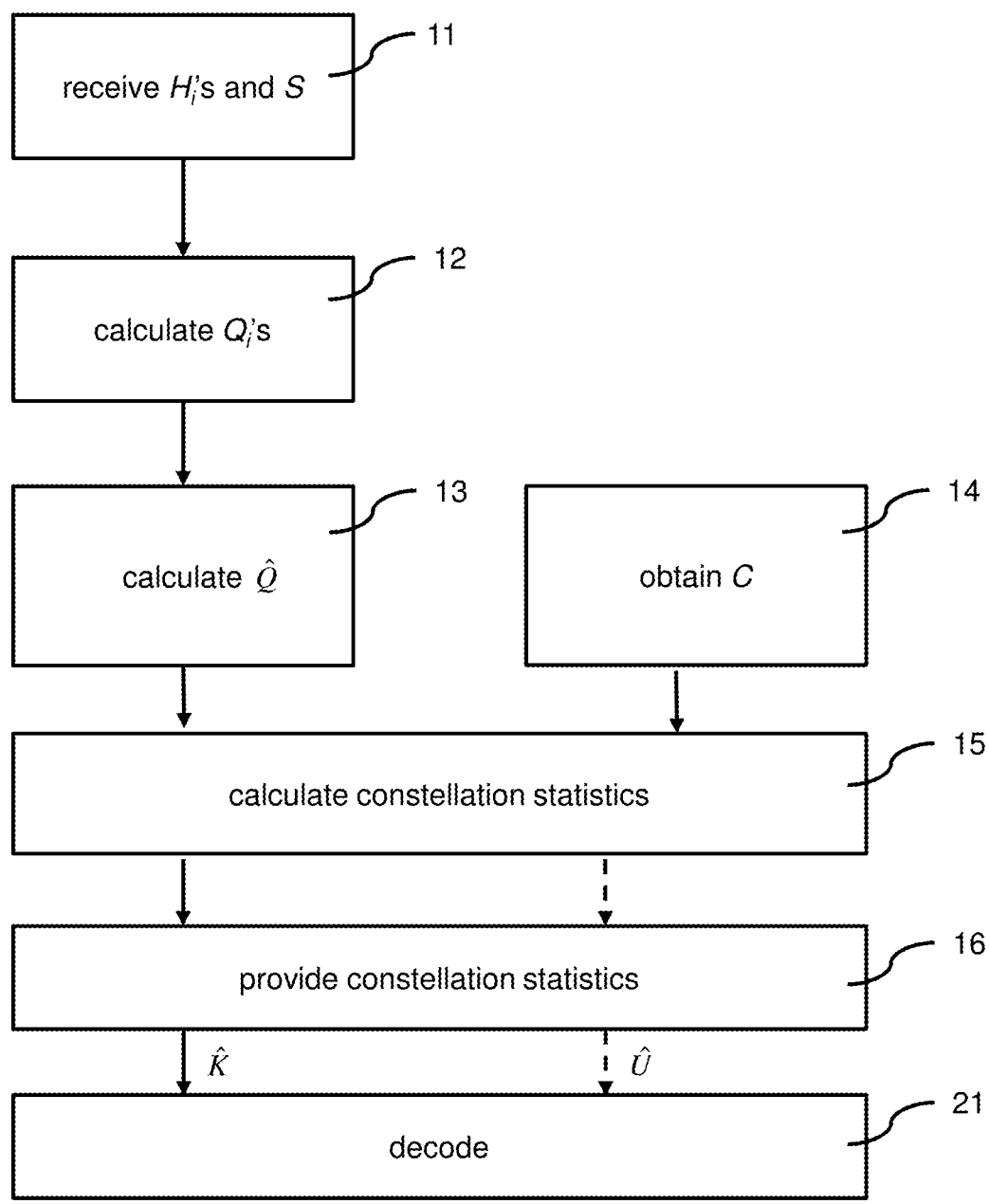
FIG. 3 schematically shows an example of a calculation of constellation statistics.

FIG. 3 schematically shows an example of a calculation of constellation statistics according to an embodiment.

In a first stage 11, the method receives channel matrices $H_i$ for all subcarriers i for all $N_{sc}$ subcarriers i of an allocation, with i =0, . . . , $N_{sc}$–1 and noise covariance matrix S. The channel matrices $H_i$ and the noise covariance matrix S may be obtained from a channel and noise estimation according to know methods. The channel matrices $H_i$ may be of dimension Rx x Lx and the noise covariance matrix S may be of dimension Rx x Rx, with Lx corresponding to the number of transmit antennas used for MIMO communication and Rx corresponding to the number of receiver antennas. In a second stage 12, the method calculates variables $Q_i$ for each subcarrier i, of the allocation according to:

$$Q_i = H_i^H S^{-1} H_i$$

In a third stage 13, the method averages the calculated variables $Q_i$ over all subcarriers i =0, . . . , $N_{sc}$–1 of the allocation to obtain an average $\hat{Q}$. Hereto, this stage 13 calculates:

$$\hat{Q} = \frac{1}{N_{sc}} \sum_{i=0}^{N_{sc}-1} Q_i$$

In a fourth stage 14, the method obtains a data signal power matrix C. Hereto, the fourth stage 14 may use well-known techniques to obtain the data signal power matrix C. As described above, the data signal power matrix C may be the identity matrix in LMMSE equalisation schemes. In interference cancellation schemes such as SIC-MMSE and PIC-MMSE, the data signal power matrix C may be different from the identify matrix. The data signal power matrix C may be of dimension Lx×Lx, with Lx corresponding to the number of transmit antennas used for MIMO communication.

In a fifth stage, the method calculates an approximate constellation energy $\hat{K}$ from the average $\hat{Q}$ and the data signal power matrix C according to:

$$\hat{K} = diag((\hat{Q}+C^{-1})^{-1}\hat{Q})$$

The method hereby effectively uses an approximation algorithm arranged to calculate approximated constellation statistics for each SC-FDMA symbol. According to the approximation algorithm, an approximate constellation energy $\hat{K}$ is calculated from the channel matrices $H_i$ for all subcarriers i, the noise covariance matrix S, and a data signal power matrix C according to:

$$Q_i = H_i^H S^{-1} H_i$$

$$\hat{Q} = \frac{1}{N_{sc}} \sum_{i=0}^{N_{sc}-1} Q_i$$

$$\hat{K} = diag((\hat{Q} + C^{-1})^{-1} \hat{Q})$$

The formula for the approximate constellation energy $\hat{K}$ used in the approximation algorithm may be compared to the known formula for the optimal constellation energy $K_{opt}$ used in the optimal algorithm, which, when rewritten in terms of variables $Q_i$, reads:

$$K_{opt} = \frac{1}{N_{sc}} \sum_{i=0}^{N_{sc}-1} diag((H_i^H S^{-1} H_i + C^{-1})^{-1} H_i^H S^{-1} H_i)$$

$$= \frac{1}{N_{sc}} \sum_{i=0}^{N_{sc}-1} diag((Q_i + C^{-1})^{-1} Q_i)$$

Comparing the formulas shows that the known formula first determines all matrices $diag((Q_i+C^{-1})^{-1}Q_i)$ for each subcarrier and then averages these results, whereas the approximation algorithm first averages all $Q_i$'s over the subcarriers and then determines its diagonal matrix diag. The approximation algorithm thus requires less matrix operations and may hereby result in a significantly reduced complexity of implementation and/or cycle count when implemented in software.

As a sixth stage 16, the method may provide the approximate constellation energy $\hat{K}$ to a decoder, such as a maximum likelihood decoder, or a demapper and Turbo decoder, or another demodulator to retrieve signal bits.

According to a further embodiment, the fifth stage also calculates an approximate constellation variance $\hat{U}$ according to:

$$\hat{U} = diag((\hat{Q}+C^{-1})^{-1})$$

This may be compared to the known formula for the optimal constellation variance $U_{opt}$, rewritten in terms of variables $Q_i$:

$$U_{opt} = \frac{1}{N_{sc}} \sum_{i=0}^{N_{sc}-1} diag((H_i^H S^{-1} H_i + C^{-1})^{-1})$$

$$= \frac{1}{N_{sc}} \sum_{i=0}^{N_{sc}-1} diag((Q_i + C^{-1})^{-1})$$

Again, a comparison between formulas of the optimal and approximate algorithm shows that the approximate algorithm may requires a significantly reduced complexity of implementation and/or cycle count when implemented in software.

In the further embodiment, the sixth stage 16 may also provide the approximate constellation variance $\hat{U}$ to the decoder. The decoder may then also use the approximate constellation variance $\hat{U}$ while decoding.

The method may further comprise a next stage 20 comprising decoding the received symbol using the associated approximate constellation energy $\hat{K}$. Decoding the received symbol may further use the approximate constellation variance $\hat{U}$.

The decoding may comprises a Turbo decoding. The decoding may comprise a maximum likelihood Euclidian based decoding.

The method may further comprise determining the channel matrices $H_i$ for all subcarriers i from at least one or more received SC-FDMA pilot symbols as channel matrix estimates, and determining the noise covariance matrix from the at least one or more received SC-FDMA pilot symbol. Thus, the estimation of the channel matrixes $H_i$ and the noise covariance matrix S matrixes may be performed for each SC-FDMA symbol, based on the least one or more received SC-FDMA pilot symbols. For example, one sub-frame may be composed of 14 symbols: on 12 symbols the UE transmits data to be decoded, and on 2 symbols the UE transmits pilot symbols which are known to the base station and may be used by the base station to estimate H and S in order to decode the 12 symbols associated with data.

The method may further comprise determining the data signal power matrix C from the at least one or more received SC-FDMA symbols.

The receiver may be an LTE receiver and the OFDM communication system may be an LTE communication system.

Figure 4:
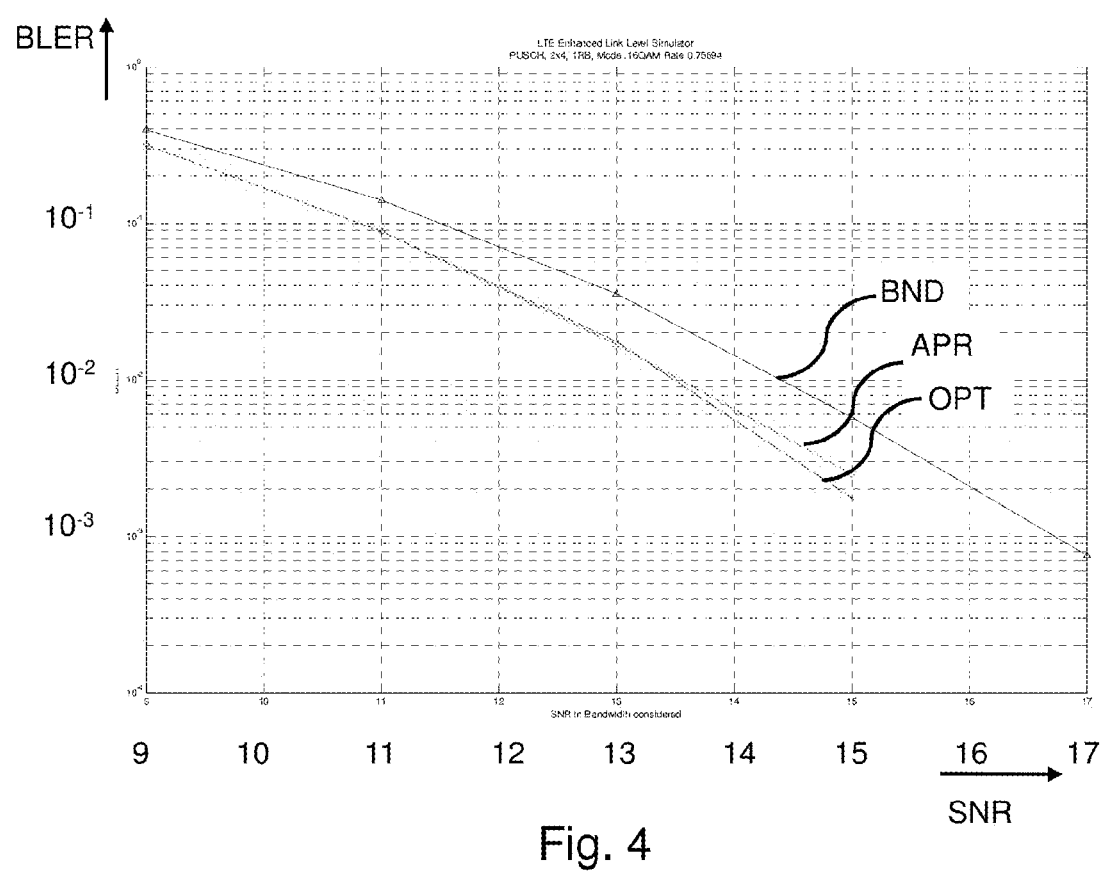
FIG. 4 schematically shows a performance of an exemplary algorithm.

FIG. 4 shows a comparison of performance of simulations of the approximation algorithm compared to the optimal algorithm. The horizontal axis indicates the signal-to-Noise ratio (SNR) in the bandwidth considered, expressed in dB. The vertical axis indicates the block error rate (BLER). The simulations were performed using 16-QAM modulation, SIC-MMSE equalization, a 2 transmitter×2 receiver MIMO application, an EVA-70 Hz fading channel model as defined in 3GPP standard document ETSI TS 136 104 V10.7.0 (2012-07), "LTE; Evolved Universal Terrestrial Radio Access (E-UTRA); Base Station (BS) radio transmission and reception (3GPP TS 36.104 version 10.7.0 Release 10)", a coding rate of 0.75 and 100 allocations per sub-frame. Curve BND represents K=U=1 and is used as a reference. Curve OPT represents the optimal algorithm. Curve APR represent the approximation algorithm. It may be observed from FIG. 4 that the performance of the approximation algorithm is substantially identical to that of the optimal algorithm.

The approximation algorithm has a reduced complexity compared to the optimal algorithm. This may be illustrated for example by comparing the resource requirements for executing the algorithms. The comparative example given below uses 12 SC-FDMA data symbols per subframe, 100 subframes per second and a 20 MHz system bandwidth.

Expressed in Millions of Cycles Per Second (MCPS), the optimal algorithm requires for this example, in three different Lx×Rx (1×2, 2×2, 2=4) MIMO scenarios:

| Operation | Formula (Lx × Rx) | MCPS 1 × 2, 20 Mhz | MCPS 2 × 2, 20 Mhz | MCPS 2 × 4, 20 Mhz |
|---|---|---|---|---|
| Calculate U using optimal algorithm (invert matrixes) | $12 * N_{oc} * Lx^4$ | 14 | 230 | 230 |
| Calculate K using optimal algorithm | $12 * N_{oc} * Lx^3$ | 14 | 115 | 115 |
| Total | | 28 | 345 | 345 | wherein $N_{sc}$ represents the number of sub-carriers in one allocation and $N_{oc}$ is the number of occupied subcarriers in the entire bandwidth. The number 12 in the formulas represents the 12 SC-FDMA data symbols per subframe. Thus, in 20 MHz, $N_{oc}$=1200, i.e., 1200 occupied subcarriers. The term $Lx^4$ in the formula for U corresponds to the number of operations required to invert a Lx×Lx matrix. The term $Lx^3$ in the formula for K corresponds to the number of operations required to multiply Lx×Lx matrixes.

For the approximation algorithm, the matrix inversion and the matrix multiplication are performed per allocation, per symbol, and the resource requirements for this example are:

| Operation | Formula (Lx × Rx) | MCPS 1 × 2, 20 Mhz | MCPS 2 × 2, 20 Mhz | MCPS 2 × 4, 20 Mhz |
|---|---|---|---|---|
| Calculate Û using approximation algorithm (invert matrixes) | $N_{alloc} * 12 * Lx^4$ | ~1 | 19 | 19 |
| Calculate K̂ using approximation algorithm | $N_{alloc} * 12 * Lx^3$ | ~1 | 10 | 10 |
| Total | | 2 (91% improvement) | 29 (91% improvement) | 29 (91% improvement) | wherein $N_{alloc}$ represents the number of allocations per subframe, which—for the MCPS indicated-corresponds to $N_{alloc}$=100, i.e., 100 allocations of 12 sub-carriers per subframe.

Again, number 12 in the formulas represents the 12 SC-FDMA data symbols per subframe, the term $Lx^4$ in the formula for U corresponds to the number of operations required to invert a Lx×Lx matrix and the term $Lx^3$ in the formula for K corresponds to the number of operations required to multiply Lx×Lx matrixes.

It may be noted that the MCPS for averaging are not included in the MCPS counts for neither the approximation method nor for the optimal method, as this operation may performed without additional MCPS.

The approximation algorithm may thus require a significantly lower number of operations (~90% reduction) than the optimal algorithm. The lower number of operations may make a software implementation in a programmable DSP or programmable microcontroller feasible. The reduced complexity of the approximation algorithm may alternatively and/or additionally allow a reduced-size hardware implementation, thereby reducing semiconductor device area and associated cost.

Figure 2:
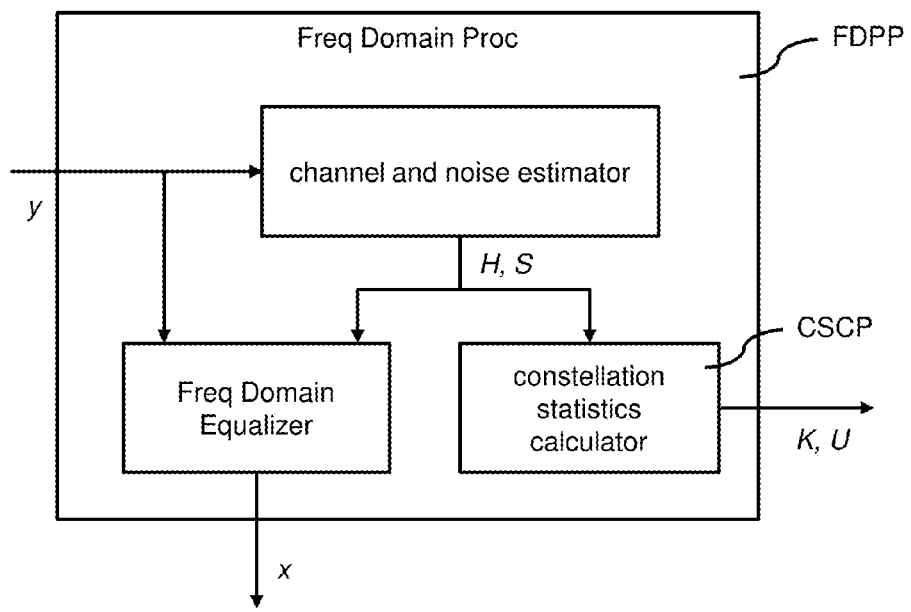
FIG. 2 schematically shows an example of a frequency domain processor.
Figure 5:
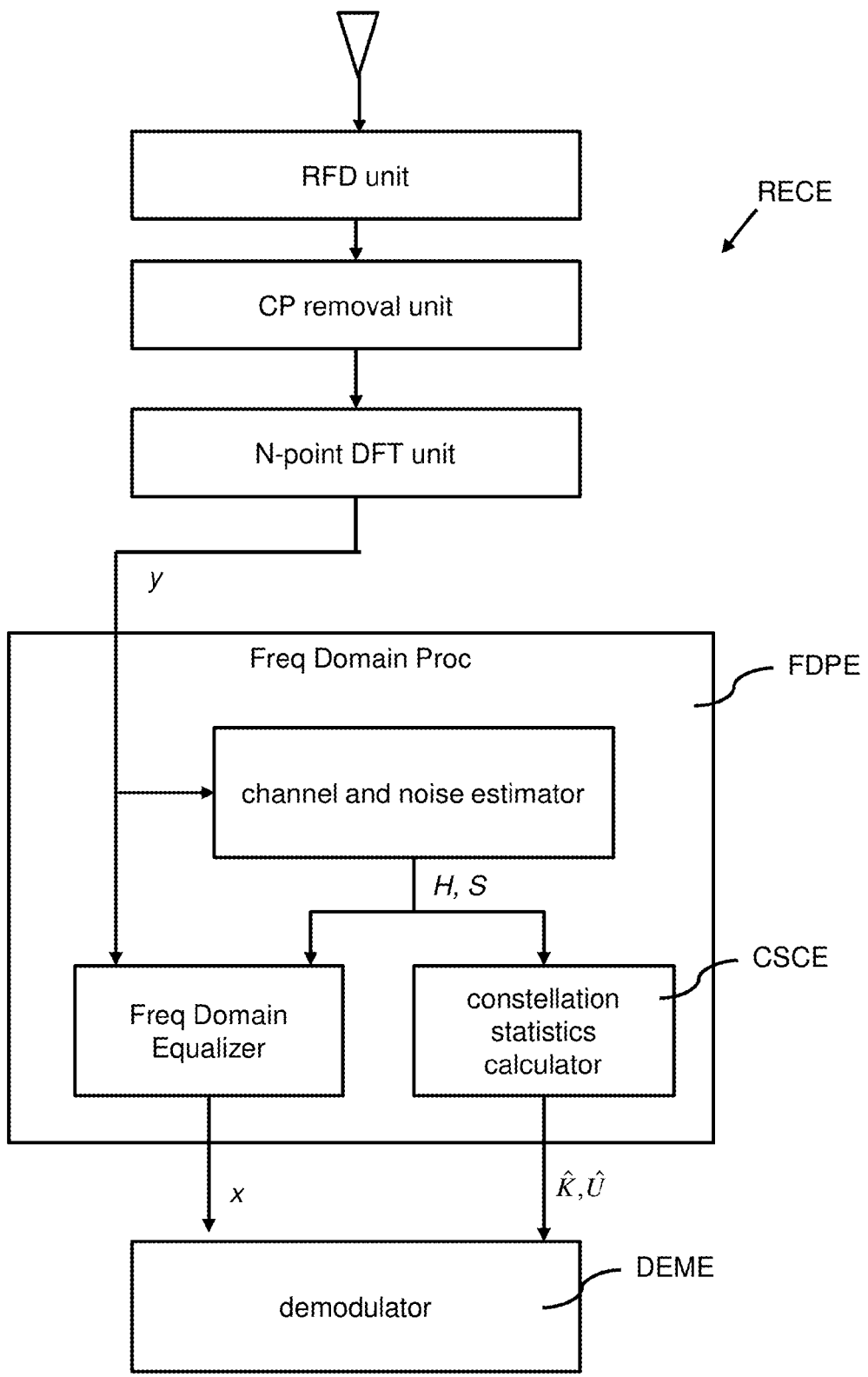
FIG. 5 schematically shows a receiver.
Figure 6:
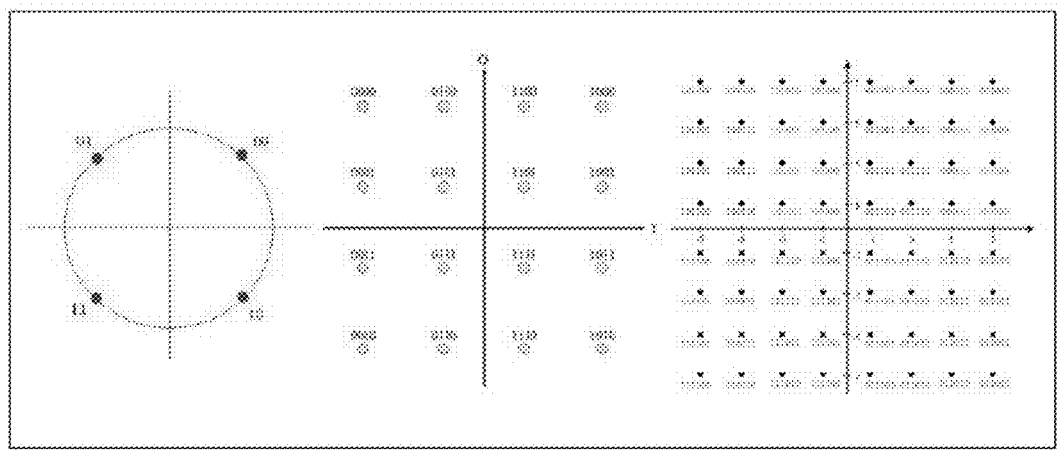
FIG. 6 schematically shows constellation diagrams for LTE.

FIG. 5 schematically shows a receiver comprising a frequency domain processor FDPE according to an embodiment. The receiver further comprises, similar to the prior art receiver described in the introduction, a RFD unit for converts an RF signal as received from one or more antennas into a digital signal, a CP removal unit for removing the Cyclic Prefix to retain a received signal vector y associated with just the FFT period and an N-point DFT unit for converting the received signal vector y from the time domain to the associated mapped subcarriers in the frequency domain. The frequency domain processor FDPE comprises a channel and noise estimator and a frequency domain equalizer that may correspond to a prior art channel and noise estimator and a prior art frequency domain equalizer, e.g. as the ones described with reference to FIG. 2. The frequency domain processor FDPE further comprises a constellation statistics calculator CSCE according to an embodiment. The constellation statistics calculator CSCE may also be referred to as constellation statistics unit CSCE. The constellation statistics calculator CSCE is arranged to perform a method of calculating an approximate constellation energy K̂, and, optionally, an approximate constellation variance Û according to any one embodiment described above. The constellation statistics calculator CSCE may thus be arranged to calculate and provide the approximate constellation energy K̂ and, in embodiments, also the approximate constellation variance Û. The receiver may comprise a programmable processor. The programmable processor may be arranged to execute a program code comprising instructions for causing the programmable processor to perform the method, or at least, to calculate an approximate constellation energy K̂, and, optionally, an approximate constellation variance Û according to any one embodiment described above. The receiver may comprise a semiconductor circuitry specially designed to execute the method. The receiver may be an LTE receiver.

Figure 7:
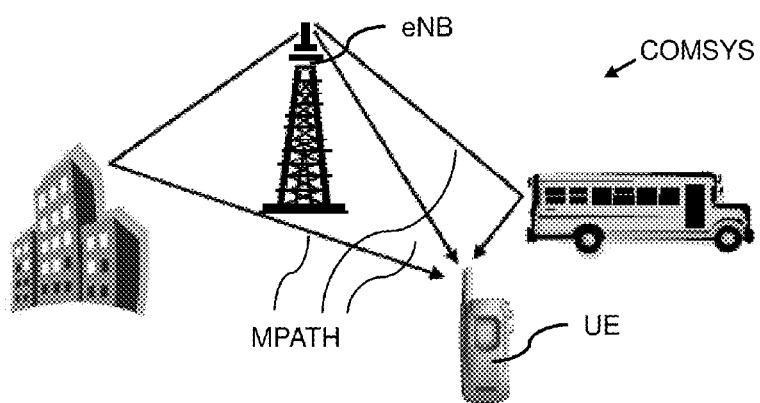
FIG. 7 schematically shows a communication system.

FIG. 7 schematically shows a communication system COMSYS according to an embodiment. The communication system COMSYS may be an LTE system. The communication system COMSYS comprises an enhanced base station eNB and a user equipment UE. The enhanced base station eNB may comprise a constellation statistics unit CSCE according to an embodiment as described above. Additionally or alternatively, the user equipment UE may comprise a constellation statistics unit CSCE according to an embodiment as described above.

Thus, an aspect provides an apparatus comprising a receiver as described above. The apparatus may be an enhanced base station, eNodeB. The apparatus may be a user equipment, UE.

The apparatus may be an enhanced base station eNB comprising a base station receiver comprising a constellation statistics unit CSCE arranged to calculate an approximate constellation energy $\hat{K}$ and an approximate constellation variance $\hat{U}$ as described above and a constellation demapper arranged to use the approximate constellation power $\hat{K}$ and the approximate constellation noise variance $\hat{U}$ to in obtaining information bits for each SC-FDMA symbol.

The apparatus may be a user equipment UE comprising a UE receiver comprising a constellation statistics unit CSCE arranged to calculate an approximate constellation energy $\hat{K}$ and an approximate constellation variance $\hat{U}$ as described above and a constellation demapper arranged to use the approximate constellation power $\hat{K}$ and the approximate constellation noise variance $\hat{U}$ to in obtaining information bits for each SC-FDMA symbol.

An aspect provides a communication system comprising an enhanced base station (eNodeB) eNB and a user equipment UE, at least one of the eNodeB and the UE comprising a constellation statistics unit CSCE arranged to calculate an approximate constellation energy $\hat{K}$ and an approximate constellation variance $\hat{U}$ as described above. The communication system may be an OFDM communication system.

Figure 8:
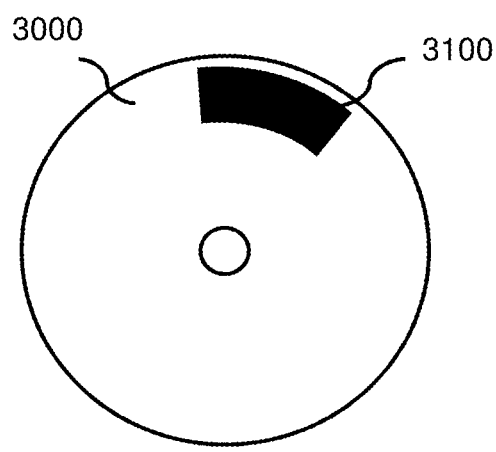
FIG. 8 shows a computer readable medium comprising a computer program product.

FIG. 8 shows a computer readable medium 3000 comprising a computer program product 3100, the computer program product 3100 comprising instructions for causing a processor apparatus to perform a method of decoding a received SC-FDMA symbol in a receiver in an OFDM communication system. The computer program product 3100 may further comprise instructions for causing the processor apparatus to perform other processing stages of the receive chain, such as frequency domain processing. The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 8 as an optical disc, the computer readable medium 3000 may be any suitable computer readable medium, such as a hard disk, solid state memory, flash memory, etc., and may be non-recordable or recordable.

The invention may thus also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Figure 1:
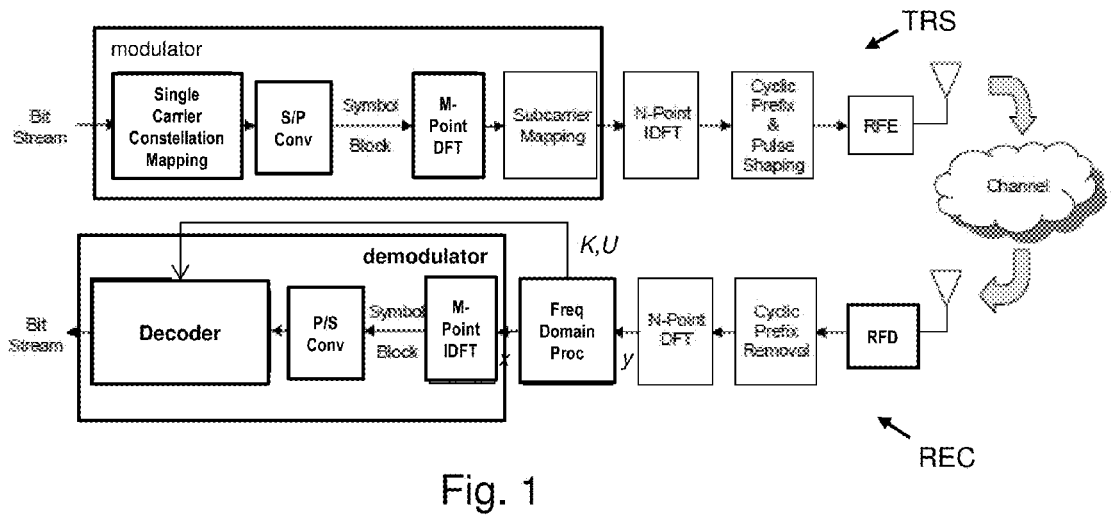
FIG. 1 schematically shows an example of a SC-FDMA transmitter/receiver arrangement.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or an limits any particular claim containing such introduced claim element to inventions containing only one such element, even when the same claim includes the introductory phrases one or more or at least one and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of decoding a received SC-FDMA symbol in a receiver in a OFDM communication system, the method comprising:

determining, in a channel and noise estimator of a frequency domain processor of the receiver, the channel matrices $H_i$ for all subcarriers i from at least one received SC-FDMA pilot symbol as channel matrix estimates, determining, in the channel and noise estimator of the frequency domain processor of the receiver, the noise covariance matrix from the at least one received SC-FDMA pilot symbol, calculating, in a constellation statistics calculator of the frequency domain processor of the receiver, an approximate constellation energy $\hat{K}$ according to:

$$Q_i = H_i^H S^{-1} H_i$$

$$\hat{Q} = \frac{1}{N_{sc}} \sum_{i=0}^{N_{sc}-1} Q_i$$

$$\hat{K} = \text{diag}\left((\hat{Q} + C^{-1})^{-1} \hat{Q}\right)$$

from channel matrices $H_i$ for all subcarriers i of $N_{sc}$ subcarriers of an allocation, a noise covariance matrix S, and a data signal power matrix C associated with the received SC-FDMA symbol, and decoding, in a demodulator of the receiver, the received symbol using the associated approximate constellation energy $\hat{K}$.

2. The method of claim 1, further comprising calculating an approximate constellation variance $\hat{U}$ according to:

$$\hat{U} = \text{diag}((\hat{Q} = C^{-1})^{-1})$$

and wherein decoding the received symbol further uses approximate constellation variance $\hat{U}$.

3. The method of claim 1, wherein the decoding comprises a Turbo decoding or a maximum likelihood Euclidian based decoding.

4. The method of claim 1, wherein the receiver is an LTE receiver and the OFDM communication system is an LTE communication system.

5. The method of claim 1, the method further comprising determining the data signal power matrix C from the at least one received SC-FDMA symbol.

6. A constellation statistics calculator (CSCE) for a receiver in a OFDM communication system, the constellation statistics calculator (CSCE) arranged to calculate an approximate constellation energy $\hat{K}$ according to:

$$Q_i = H_i^H S^{-1} H_i$$

$$\hat{Q} = \frac{1}{N_{sc}} \sum_{i=0}^{N_{sc}-1} Q_i$$

$$\hat{K} = \text{diag}\left((\hat{Q} + C^{-1})^{-1} \hat{Q}\right)$$

from channel matrices $H_i$ for all subcarriers i of $N_{sc}$ subcarriers of an allocation, a noise covariance matrix S, and a data signal power matrix C associated with a received SC-FDMA symbol, wherein the associated approximate constellation energy $\hat{K}$ is used in the receiver to decode the received SC-FDMA symbol.

7. A constellation statistics calculator (CSCE) of claim 6, further arranged to calculate an approximate constellation variance $\hat{U}$ according to:

$$\hat{U} = \text{diag}((\hat{Q} = C^{-1})^{-1}).$$

8. A receiver (RECE) comprising a constellation statistics calculator (CSCE) of claim 6.

9. The receiver of claim 8, wherein the receiver is an LTE receiver.

10. An OFDM communication system comprising the receiver of claim 9.

11. The method of claim 2, further comprising:
determining the channel matrices $H_i$ for all subcarriers i from at least one received SC-FDMA pilot symbol as channel matrix estimates, and
determining the noise covariance matrix from the at least one received SC-FDMA pilot symbol.

12. The method of claim 3, further comprising:
determining the channel matrices $H_i$ for all subcarriers i from at least one received SC-FDMA pilot symbol as channel matrix estimates, and
determining the noise covariance matrix from the at least one received SC-FDMA pilot symbol.

13. The method of claim 4, further comprising:
determining the channel matrices $H_i$ for all subcarriers i from at least one received SC-FDMA pilot symbol as channel matrix estimates, and
determining the noise covariance matrix from the at least one received SC-FDMA pilot symbol.

\* \* \* \* \*